US012237103B2

(12) United States Patent
Zhu et al.

(10) Patent No.: US 12,237,103 B2
(45) Date of Patent: Feb. 25, 2025

(54) ELECTRICAL STEEL LAMINATION STACKS WITH MAGNETIC INSULATOR COATING FOR ELECTRICAL APPARATUS CORES

(71) Applicant: FORD GLOBAL TECHNOLOGIES, LLC, Dearborn, MI (US)

(72) Inventors: Leyi Zhu, Novi, MI (US); Franco Leonardi, Dearborn Heights, MI (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 171 days.

(21) Appl. No.: 17/583,080

(22) Filed: Jan. 24, 2022

(65) Prior Publication Data

US 2023/0238163 A1    Jul. 27, 2023

(51) Int. Cl.
*H02K 1/02* (2006.01)
*H01F 1/34* (2006.01)

(52) U.S. Cl.
CPC ............ *H01F 1/344* (2013.01); *H02K 1/02* (2013.01)

(58) Field of Classification Search
CPC ...... H01F 1/344; H01F 10/20; H01F 41/0233; H01F 27/245; H01F 1/01; H01F 3/02; H02K 1/02; H02K 2213/03; H02K 1/04; H02K 1/06; C09D 1/00; C09D 5/23; H01B 3/025; H01B 3/10
USPC ................................................... 310/216.004
See application file for complete search history.

(56) References Cited

U.S. PATENT DOCUMENTS

| 9,919,340 | B2 | 3/2018 | Kreidler et al. |
| 10,025,142 | B2 | 7/2018 | Woo et al. |
| 10,199,910 | B2 | 2/2019 | Liang et al. |
| 10,355,537 | B2 | 7/2019 | Zhu et al. |
| 2012/0023950 | A1* | 2/2012 | Weeks ...................... F02C 9/50 60/722 |
| 2018/0071545 | A1* | 3/2018 | Saitoh .................... A61N 2/008 |
| 2019/0181734 | A1* | 6/2019 | Rong .................. C21D 8/1244 |
| 2021/0343466 | A1* | 11/2021 | Honma ............... H01F 41/0233 |
| 2022/0028608 | A1* | 1/2022 | Kamikawabata ... H01F 41/0233 |
| 2023/0238163 | A1* | 7/2023 | Zhu .......................... H02K 1/02 310/216.004 |

FOREIGN PATENT DOCUMENTS

DE    102016119654    4/2018

* cited by examiner

*Primary Examiner* — Thomas Truong
(74) *Attorney, Agent, or Firm* — David B. Kelley; Brooks Kushman P.C.

(57) ABSTRACT

A core for an electrical apparatus includes a plurality of electrical steel sheets having a ferromagnetic or ferrimagnetic coating applied to both sides of the electrical steel sheets. The electrical steel sheets are arranged in a stack to form a laminated stack. The ferromagnetic or ferrimagnetic coating is applied to both sides of the electrical steel sheets. The coating may comprise MnZn ferrites, NiZn ferrites, MgMnZn ferrites, CoNiZn ferrites, Co ferrites, Ni ferrites, Yttrium iron garnets (Y3Fe5O12) or other ferromagnetic or ferrimagnetic coating materials.

18 Claims, 6 Drawing Sheets

| Coating Type | Conventional ($\mu_r=1$) | | Magnetic Insulator ($\mu_r=500$) | |
|---|---|---|---|---|
| Stacking Factor | $\mu_{stack,n}$ | $\mu_{stack,t}$ | $\mu_{stack,n}$ | $\mu_{stack,t}$ |
| 1.0 | 10000 | 10000 | 10000 | 10000 |
| 0.995 | 196 | 9950 | 9132 | 9952 |
| 0.99 | 99 | 9900 | 8403 | 9905 |
| 0.97 | 33 | 9700 | 6369 | 9715 |
| 0.95 | 20 | 9500 | 5128 | 9525 |

Fig-3

| Properties | SMC | Electrical Steel with Conventional Coating | Electrical Steel with Magnetic Insulator Coating |
|---|---|---|---|
| Magnetic Permeability | Low, Isotropic | High, Highly Anisotropic | High, Weakly Anisotropic |
| Saturation Flux Density | Low | High | Highest |
| 3D Flux Path | Yes, Isotropic | No, Highly Anisotropic | Yes, Weakly Anisotropic |

Fig-4

ELECTRICAL STEEL LAMINATION STACKS WITH MAGNETIC INSULATOR COATING FOR ELECTRICAL APPARATUS CORES

TECHNICAL FIELD

This disclosure relates to coatings for electrical steel used in the cores of transformers, inductors, stators and rotors of electric machines.

BACKGROUND

Electrical steel used in cores of electrical apparatus such as transformers, inductors, stators and rotors of electric machines are stamped to make laminations to form cores. Electrical steel used to make cores is usually coated with insulation on both sides of the electrical steel sheets to reduce eddy current losses. Conventional coatings prevent magnetic flux from passing in the normal, or perpendicular, direction relative to the plane of the electrical steel sheets. Conventional insulating coatings reduce stack saturation flux density.

Conventional electrical steel coatings are classified as organic coatings or inorganic coatings or a combination thereof. Inorganic coatings are generally comprised of metal oxides and phosphates. Organic coatings are generally either thermoplastic or thermoset plastic materials. Inorganic and organic coatings are non-ferromagnetic (not having a high susceptibility to magnetization) and non-ferrimagnetic (not a material having a weak form of ferromagnetism associated with parallel but opposite alignment of neighboring atoms) and have relative magnetic permeability of $\mu_r=1$. The coatings provide electrical insulation and can be treated as air gaps in the stack of laminations. The coatings are characterized by low permeability in the stack's normal direction and low magnetic flux density. The lamination core passes magnetic flux essentially only in the stack tangential direction (the lamination surface plane).

This disclosure is directed to solving the above problems and other problems as summarized below.

SUMMARY

According to one aspect of this disclosure, a core for an electrical apparatus is disclosed that includes a plurality of electrical steel sheets having a ferromagnetic or ferrimagnetic coating applied to both sides of the electrical steel sheets. The electrical steel sheets are arranged in a stack to form a laminated stack. The ferromagnetic or ferrimagnetic coating applied to both sides of the electrical steel sheets has a relative magnetic permeability of between $\mu_r=500$ to 20,000.

According to another aspect of this disclosure, a core for an electrical apparatus is disclosed that includes a plurality of electrical steel sheets having a ferromagnetic or ferrimagnetic coating applied to both sides of the electrical steel sheets. The electrical steel sheets are arranged in a stack to form a laminated stack. An electrically insulator magnetically permeable coating is applied to both sides of the electrical steel sheets having wherein the relative electrical permittivity of the coating is finite and greater than 1.

According a further aspect of this disclosure, a core for an electrical apparatus is disclosed that includes a plurality of electrical steel sheets having a ferromagnetic or ferrimagnetic coating applied to both sides of the electrical steel sheets. The electrical steel sheets are arranged in a stack to form a laminated stack. The ferromagnetic or ferrimagnetic coating applied to both sides of the electrical steel sheets, wherein the coating comprises:

MnZn ferrites;
NiZn ferrites;
MgMnZn ferrites;
CoNiZn ferrites;
Co ferrites;
Ni ferrites; or
Yttrium iron garnets (Y3Fe5O12).

Other alternative features of this disclosure that may be included with the above aspects of the disclosure, the coating may be electrically insulating and may have a finite and greater than 1 dielectric constant.

The coating may comprise MnZn ferrites; NiZn ferrites; MgMnZn ferrites; CoNiZn ferrites; Co ferrites; Ni ferrites; and Yttrium iron garnets (Y3Fe5O12).

The coating may have a thickness of between is 0.05 and 5 micrometers.

The core may be adapted to be used in a transformer; an inductor; a stator; or a rotor.

The above aspects of this disclosure and other aspects will be described below with reference to the attached drawings.

BRIEF DESCRIPTION OF THE DRAWINGS

FIG. 3 is a table of the stack normal permeabilities of a lamination having a stacking factor of 0.97 for conventional coating and magnetic insulator coating FIG. 4 is a table comparing the magnetic properties of soft magnetic composite (SMC), to electrical steel with a magnetic insulator coating, and to electrical steel with a conventional insulator coating.

FIG. 7 6 is a graph illustrating the relative magnetic permeability ($\mu_r$) in the stack normal direction of SMC, lamination stacks with conventional coating, and magnetic laminations with magnetic insulator coating.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Electrical steel sheets are stamped and then stacked together to make laminations to form the cores of transformers, inductors, and the cores of stators and rotors of electric machines. Electrical steel may include a range of iron alloys that have favorable magnetic properties for electric machine construction. Iron alloys suitable for electrical steel may include a percentage of silicon. Electrical steel sheet has various thicknesses, typically in the range from 0.65 mm to 0.1 mm.

Electrical steel is usually coated on both surfaces to increase electrical resistance between the laminations and reduce eddy current loss. The coating also provides resistance to corrosion or rusting and acts as lubrication during stamping. ASTM A9760-3 classifies the different types of coating for electrical steels from C0 to C6. All the coating materials are non-ferromagnetic and non-ferrimagnetic with relative magnetic permeability $\mu_r=1$. In other words, the coating layers can be treated as airgaps in the stack, which leads to very low permeability along the stack's normal direction and have low saturation flux density.

Figure 1:
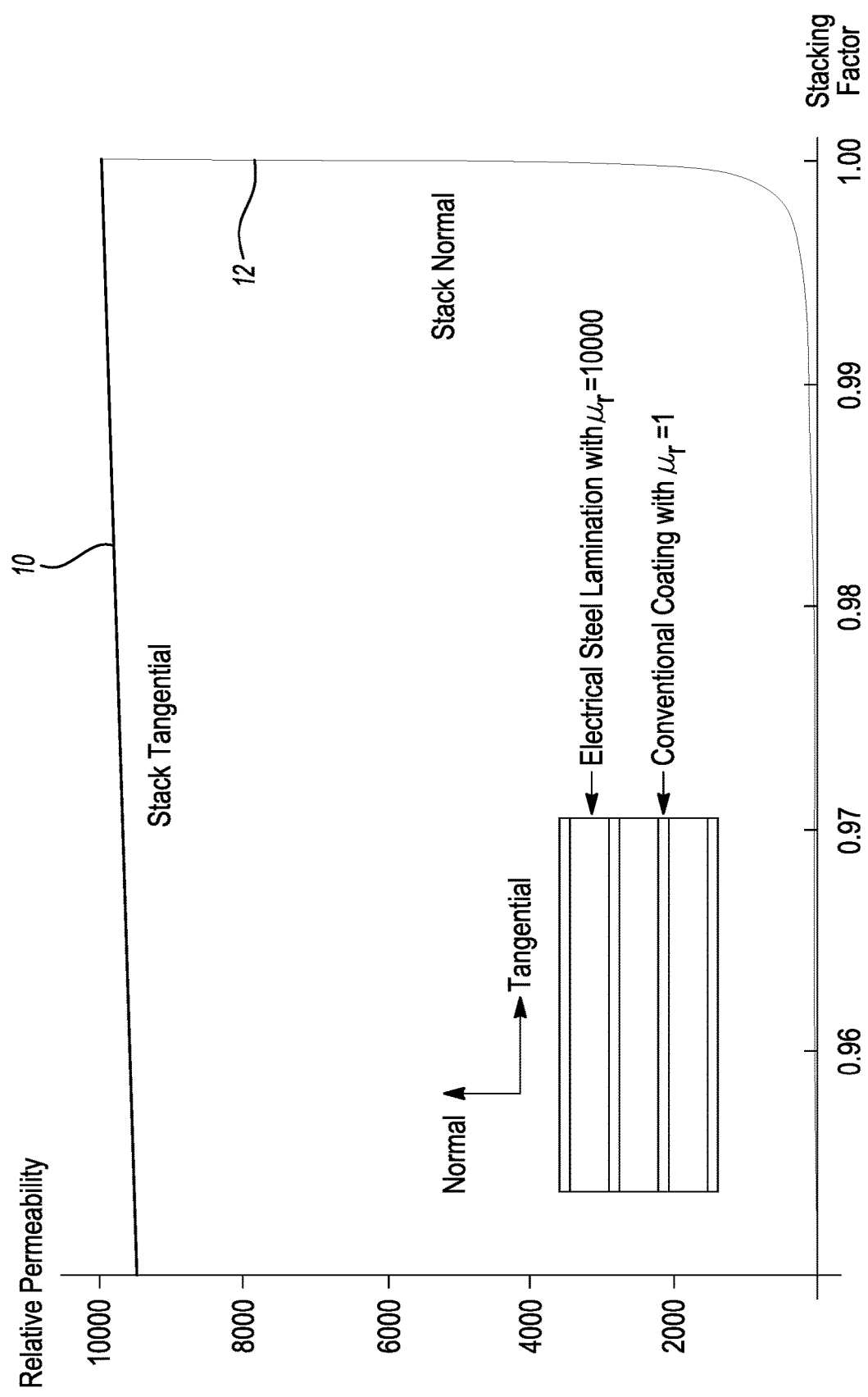
FIG. 1 is a chart of the calculated relative permeability of electrical steel coated with conventional coatings as a function of the stacking factor

FIG. 1 illustrates the calculated relative permeability of electrical steel coated with conventional coatings as a function of the stacking factor (defined as total lamination thickness/total stack thickness) for both stack normal and stack tangential directions. Line 10 in FIG. 1 shows the stack tangential permeability as a function of the stacking factor. Line 12 shows the stack normal relative permeability as a function of the stacking factor. Stack normal permeability drops very rapidly with decreasing stacking factor. As a result, the lamination core can only pass magnetic flux in essentially one direction, which is along the stack tangential or the lamination surface plane.

Figure 2:
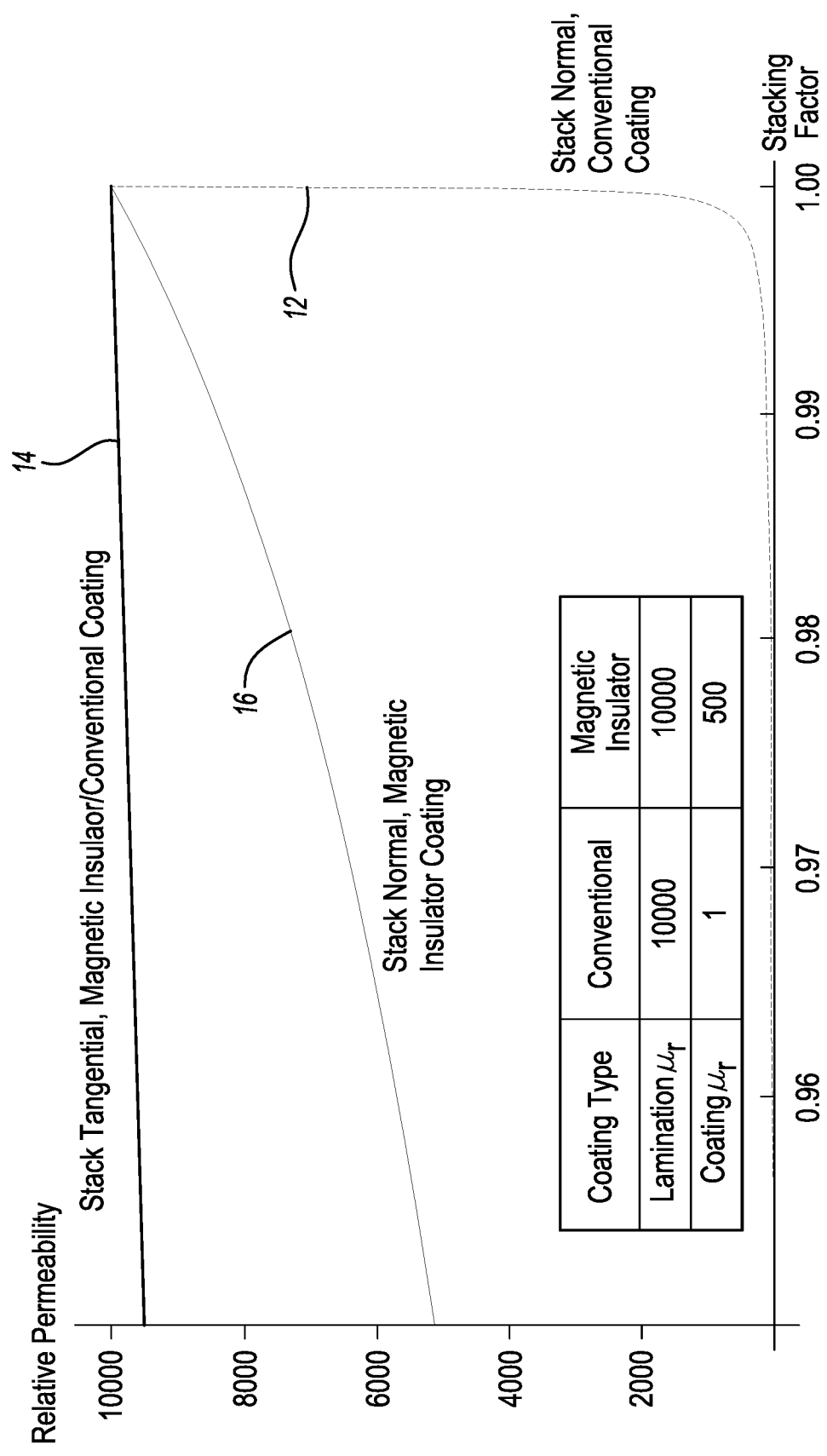
FIG. 2 is a chart of the calculated relative permeability as a function of stacking factor for both stack normal and stack tangential directions when the coating is a magnetic insulator with $\mu_r=500$ and a conventional coating with $\mu_r=1$

FIG. 2 illustrates the calculated relative stack tangential permeability of electrical steel coated with magnetic insulator coatings as a function of the stacking factor as modeled for magnetic insulator coatings on line 14. The calculated relative stack normal permeability of electrical steel coated with magnetic insulator coatings as a function of the stacking factor as modeled is illustrated by line 16.

Magnetic insulator coating materials are provided on the surface of electrical steel sheets. The magnetic insulator coating material is electrically insulating while possessing magnetic orderings, such as ferrimagnetic ordering. A few examples of such magnetic insulators are MnZn ferrites, NiZn ferrites, MgMnZn ferrites, CoNiZn ferrites, Ni ferrites, Co ferrites, and Yttrium iron Garnets (Y3Fe5O12), and the like. These materials have good magnetic properties with relative magnetic permeability ($\mu_r$) ranges from 10 to 20000 and high resistivity.

FIG. 2 shows the calculated relative permeability as a function of stacking factor for both stack normal and stack tangential directions when the coating is a magnetic insulator with $\mu_r=500$ and a conventional coating with $\mu_r=1$. For stack normal permeability, the stack with magnetic insulator coating line 16 drops much slower than the stack with a conventional coating line 12.

Referring to FIG. 3, for a stacking factor of 0.97, the stack normal permeabilities are 33 vs. 6369 for conventional coating and magnetic insulator coating respectively. Laminations with magnetic insulator coatings can pass magnetic flux in any direction. For the stack tangential permeability, there is no significant difference between conventional coating line 10 and magnetic insulator coating line 14 (e.g. 9700 vs. 9715 for 0.97 stacking factor). For the stack with magnetic insulator coating, the permeability difference between stack normal and stack tangential directions indicates a weak anisotropy in permeability. The permeability anisotropy increases with decreasing stacking factor as shown in FIGS. 2 and 3.

FIG. 4 compares the magnetic properties of soft magnetic composite (SMC) to electrical steel with a magnetic insulator coating and to electrical steel with a conventional insulator coating. Both materials SMC and electrical steel with a magnetic insulator coating allow a 3D flux path, but electrical steel with magnetic insulator coating has a much higher magnetic permeability than SMC (thousands vs. hundreds), which is desirable for motor cores. Electrical steel with magnetic insulator coating shows a weak anisotropy for magnetic permeability as shown in FIGS. 2 and 3, while SMC is isotropic in permeability. Also, the additional magnetization due to the magnetic insulator coating (e.g. ferrites) improves the stack's saturation flux density, and therefore the effective stacking factor increases for the same coating layer thickness.

Electrical steel with a conventional coating has high magnetic permeability and is highly anisotropic. The conventional coating has high saturation flux density but less than the saturation flux density of the magnetic insulator coating. Electrical steel with a conventional coating has no 3D flux path because it is highly anisotropic.

Electrical steel with a magnetic insulator coating enables new types of magnetic circuit designs with a high degree of freedom. Electrical steel with a magnetic insulator coating presents benefits in terms of high torque density especially for low-speed high torque applications. The new electrical steel with magnetic insulator coating simplifies the manufacturing process of axial and transverse flux electric machines.

Figure 5:
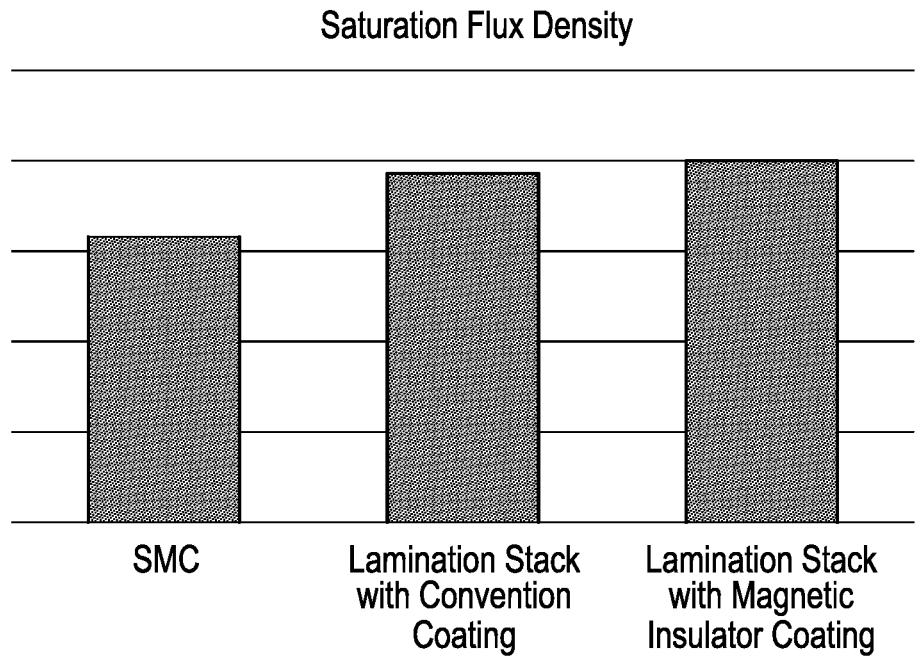
FIG. 5 is a graph illustrating the relative saturation flux density of SMC, lamination stacks with conventional coating, and magnetic laminations with magnetic insulator coating.

Referring to FIG. 5, the relative saturation flux density of SMC, lamination stacks with conventional coating, and magnetic laminations with magnetic insulator coating are illustrated.

Figure 6:
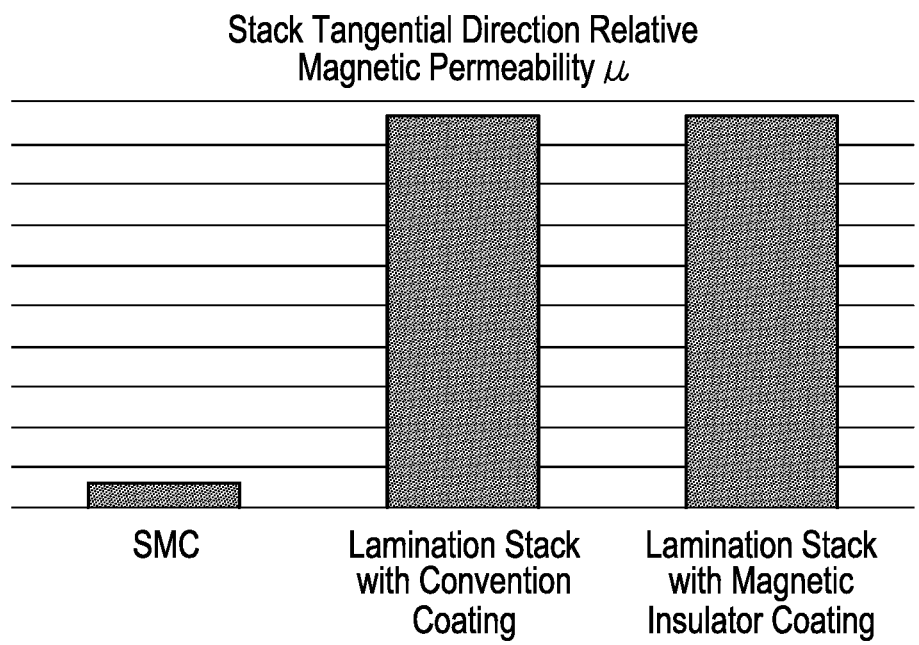
FIG. 6 is a graph illustrating the relative magnetic permeability ($\mu_r$) in the stack tangential direction of SMC, lamination stacks with conventional coating, and magnetic laminations with magnetic insulator coating

Referring to FIG. 6, the relative magnetic permeability ($\mu_r$) in the stack tangential direction of SMC, lamination stacks with conventional coating, and magnetic laminations with magnetic insulator coating are illustrated.

Figure 7:
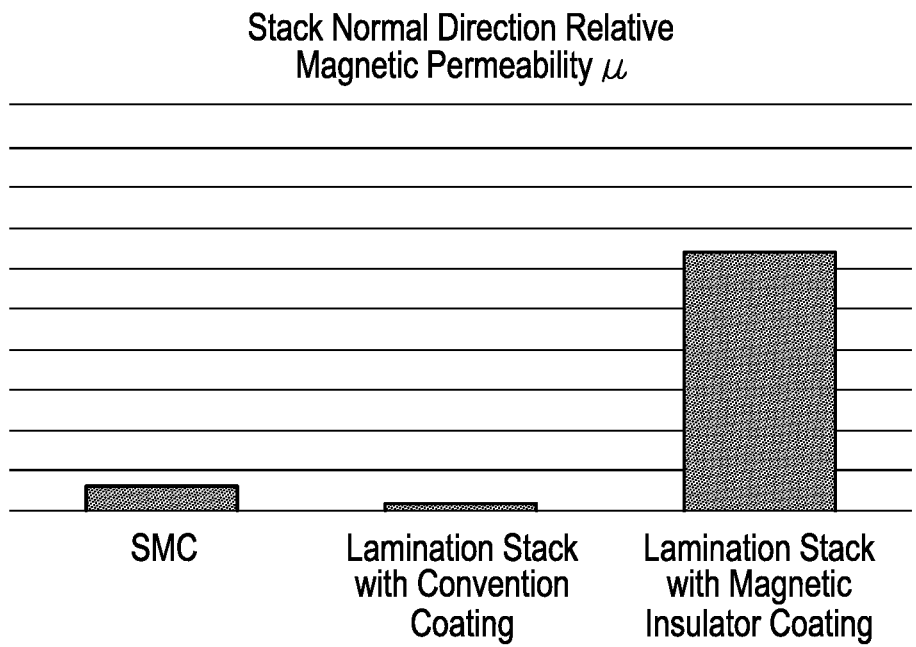

Referring to FIG. 7, the relative magnetic permeability ($\mu_r$) in the stack normal direction of SMC, lamination stacks with conventional coating, and magnetic laminations with magnetic insulator coating are illustrated.

Figure 8:
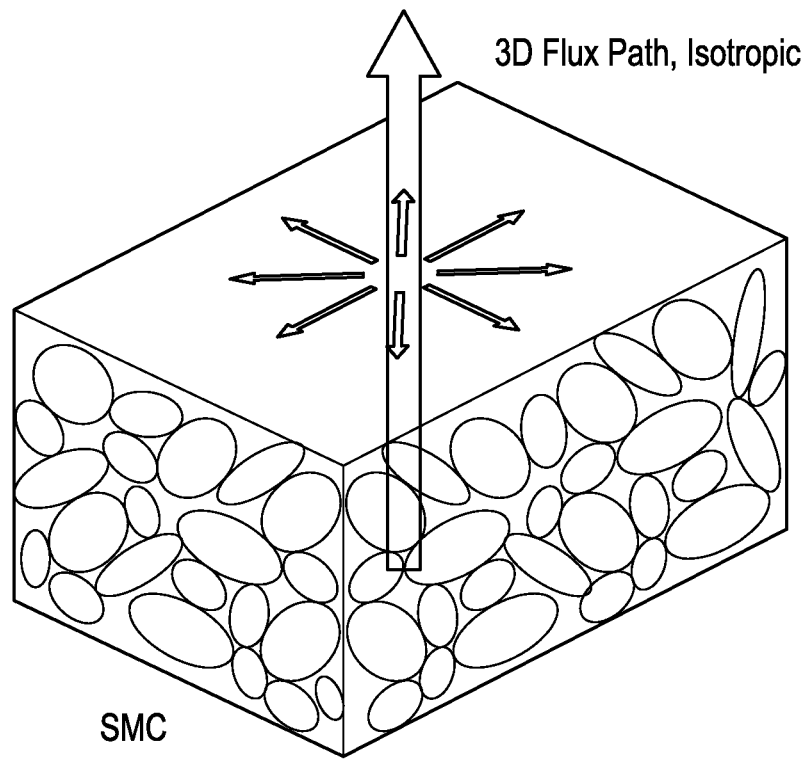
FIG. 8 is a diagrammatic illustration of the isotropic 3D flux path for SMC.

Referring to FIG. 8, the isotropic 3D flux path for SMC is illustrated diagrammatically.

Figure 9:
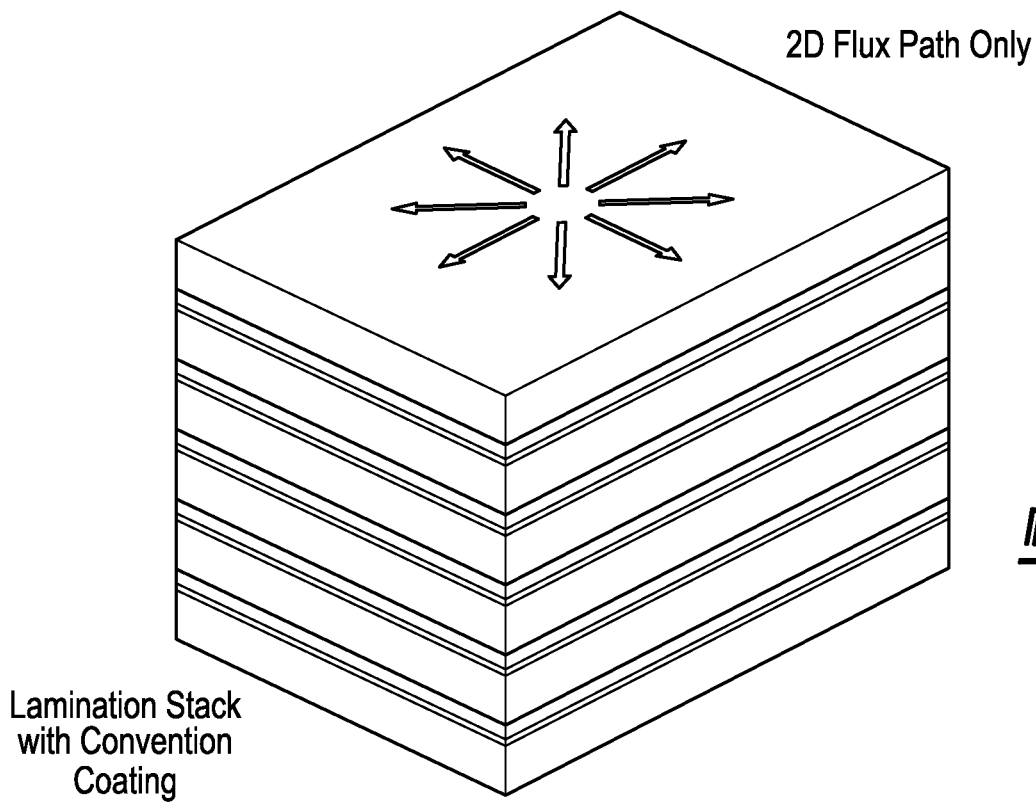
FIG. 9 is a diagrammatic illustration of the 2D flux path characteristic of lamination stacks with conventional insulator coatings.

Referring to FIG. 9, the 2D flux path characteristic of lamination stacks with conventional insulator coatings is illustrated diagrammatically.

Figure 10:
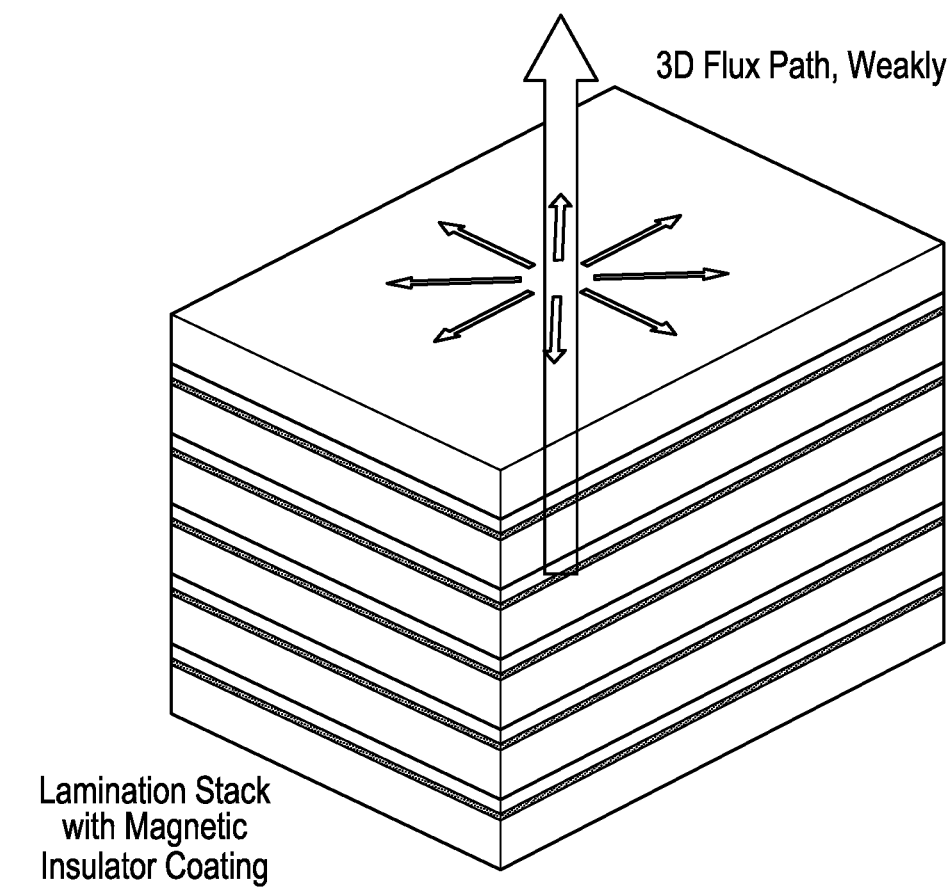
FIG. 10 is a diagrammatic illustration of the 3D flux path characteristic of lamination stacks with magnetic insulator coatings.

Referring to FIG. 10, the 3D flux path characteristic of lamination stacks with magnetic insulator coatings is illustrated diagrammatically.

Coating the magnetic insulator layer on one or both surfaces of electrical steel sheets, may be performed with conventional coating or a printing process, such as a dip coating or spin coating process. The thickness of the coating layer can be as thin as tens of nanometer to several micrometers. The thickness of the coating may be in the range of between 0.05 and 5 micrometers.

In a dip-coating process, after immersing the electrical steel sheet into a viscous coating solution containing a metal-organic complex, the electrical steel sheet is then taken out of the coating solution and subject to a heat treatment. In the spin coating process, the magnetic insulator coating layer is formed by spin coating a diluted solution containing the metal on the electrical steel sheet or stamped lamination, and subsequently heating the electrical steel sheet or stamped lamination. Other coating methods, such as chemical vapor deposition, electrophoretic deposition (EPD) can also be used.

The ferrite type magnetic insulators that are discussed in this disclosure are examples only, and other types of magnetic insulators may also be used as the coating material for electrical steel.

The embodiments described above are prophetic examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A core for an electrical apparatus comprising:
a plurality of electrical steel sheets arranged in a stack to form a laminated stack; and
a magnetic insulator coating applied to both sides of the electrical steel sheets, wherein a relative magnetic permeability of the coating is between $\mu_r=500$ to 20,000, wherein
the magnetic insulator coating allows magnetic flux to pass in a normal direction to a plane of the laminated stack to increase saturation flux density of the laminated stack.

2. The core of claim 1 wherein the coating is electrically insulating and has a finite and greater than 1 dielectric constant.

3. The core of claim 1 wherein the coating consists of:
MnZn ferrites;
NiZn ferrites;
MgMnZn ferrites;
CoNiZn ferrites;
Co ferrites;
Ni ferrites; or
Yttrium iron garnets (Y3Fe5O12).

4. The core of claim 1 wherein the coating has a thickness of between is 0.05 and 5 micrometers.

5. The core of claim 1 wherein the core is adapted to be used in a transformer.

6. The core of claim 1 wherein the core is adapted to be used in an inductor.

7. The core of claim 1 wherein the core is adapted to be used in a stator.

8. The core of claim 1 wherein the core is adapted to be used in a rotor.

9. A core for an electrical apparatus comprising:
a plurality of electrical steel sheets arranged in a stack to form a laminated stack; and
an electrically insulative magnetically permeable coating applied to both sides of the electrical steel sheets, wherein a relative electrical permittivity of the coating is finite and greater than 1, and the relative magnetic permeability of the coating is between $\mu_r=500$ to 20,000, wherein
the magnetic insulator coating allows magnetic flux to pass in a normal direction to a plane of the laminated stack to increase saturation flux density of the laminated stack.

10. The core of claim 9 wherein the coating consists essentially of:
MnZn ferrites;
NiZn ferrites;
MgMnZn ferrites;
CoNiZn ferrites;
Co ferrites;
Ni ferrites; or
Yttrium iron garnets (Y3Fe5O12).

11. The core of claim 9 wherein the coating has a thickness of between 0.05 and 5 micrometers.

12. The core of claim 9 wherein the core is adapted to be used in a transformer.

13. The core of claim 9 wherein the core is adapted to be used in an inductor.

14. The core of claim 9 wherein the core is adapted to be used in a stator.

15. The core of claim 9 wherein the core is adapted to be used in a rotor.

16. A core for an electrical apparatus comprising: a plurality of electrical steel sheets arranged in a stack to form a laminated stack; and
an electrically insulative magnetically permeable coating applied to both sides of the electrical steel sheets, wherein the coating comprises:
MnZn ferrites;
NiZn ferrites;
MgMnZn ferrites;
CoNiZn ferrites;
Co ferrites;
Ni ferrites; or
Yttrium iron garnets (Y3Fe5O12), wherein
the magnetic insulator coating allows magnetic flux to pass in a normal direction to a plane of the laminated stack to increase saturation flux density of the laminated stack.

17. The core of claim 16 wherein the coating has a thickness of between 0.05 and 5 micrometers.

18. The core of claim 16 wherein the relative magnetic permeability of the coating is between $\mu_r=500$ to 20,000.

* * * * *